United States Patent
Hyde, II et al.

(10) Patent No.: US 6,490,644 B1
(45) Date of Patent: Dec. 3, 2002

(54) LIMITING WRITE DATA FRACTURING IN PCI BUS SYSTEMS

(75) Inventors: Joseph Smith Hyde, II, Tucson, AZ (US); Robert Earl Medlin, Tucson, AZ (US); Juan Antonio Yanes, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,387

(22) Filed: Mar. 8, 2000

(51) Int. Cl.[7] ............................................. G06F 13/372
(52) U.S. Cl. ........................ 710/125; 710/107; 710/118; 710/119
(58) Field of Search ............................... 710/33, 35, 39, 710/100, 107, 113, 118, 305, 306, 119, 125; 711/167, 169

(56) References Cited

U.S. PATENT DOCUMENTS

| | | | |
|---|---|---|---|
| 5,740,376 A | 4/1998 | Carson et al. | 395/281 |
| 5,764,929 A | 6/1998 | Kelley et al. | 395/287 |
| 5,778,199 A | 7/1998 | Wanner et al. | 395/287 |
| 5,815,677 A * | 9/1998 | Goodrum | 710/22 |
| 5,850,350 A | 12/1998 | Chen et al. | 395/293 |
| 5,897,667 A | 4/1999 | Miller et al. | 711/218 |
| 5,918,072 A | 6/1999 | Bhattacharya | 395/855 |
| 5,935,223 A | 8/1999 | Griffith et al. | 710/38 |
| 5,941,960 A | 8/1999 | Miller et al. | 710/35 |
| 5,951,664 A | 9/1999 | Lambrecht et al. | 710/124 |
| 6,029,607 A1 * | 3/2001 | Collins et al. | 710/240 |

FOREIGN PATENT DOCUMENTS

EP 0924623 A2 6/1999 .......... G06G/13/40

OTHER PUBLICATIONS

"Enhanced Arbitration Scheme to Increase Peripheral Component Interconnect Bus Performance during Delay Transactions Handled by a Personal Component Interdonnect–to–Personal Component Interconnect Bridge", IBM Technical Disclosure Bulletin, vol. 40, No. 06, Jun. 1997, pp. 197–198.

"Method for Improving Peripheral Component Interconnect Bus Bandwidth for Systems with Limited Prefetch", IBM Technical Disclosure Bulletin, vol. 40, No. 01, Jan. 1997, pp. 23–25..

* cited by examiner

Primary Examiner—Peter Wong
Assistant Examiner—Christopher E. Lee
(74) Attorney, Agent, or Firm—John H. Holcombe (57) ABSTRACT

A system for limiting fracturing of write data by a PCI bus adapter which queues operation commands in a command queue. The write data is in the form of bursts comprising a plurality of contiguous words. Fracture detection logic senses fracturing of the write data. A bus arbiter is responsive to the sensed fracturing of write data by the target, and blocks access to the PCI bus. Queue level detection logic is employed, subsequent to the blocking, to monitor completion of the queued operation commands of the PCI bus target. The bus arbiter is then responsive to the queue level detection logic indicating that the PCI bus target has completed enough operations that a predetermined number (such as one) of the operation commands remain queued at its command queue, and grants access to the PCI bus to complete the burst write operation without fracturing.

15 Claims, 6 Drawing Sheets

FIG. 6

LIMITING WRITE DATA FRACTURING IN PCI BUS SYSTEMS

DOCUMENTS INCORPORATED BY REFERENCE

Commonly assigned U.S. patent application Ser. No. 09/275,610 is incorporated for its showing of a PCI bus bridge system for processing requests from multiple attached hosts.

FIELD OF THE INVENTION

This invention relates to the transfer of write data across a PCI bus, and, more particularly, to accommodating the transfer of bursts of write data in an environment of a plurality of agents attached to the PCI bus.

BACKGROUND OF THE INVENTION

The Peripheral Component Interconnect (PCI) bus system is a high-performance expansion bus architecture which offers a low latency path employing PCI bridges through which a host processor may directly access PCI devices. In a multiple host environment, a PCI bus system may include such functions as data buffering and PCI central functions such as arbitration over usage of the bus system.

The incorporated '610 application describes an example of a complex PCI bus system for providing a connection path between a secondary PCI bus, to which are attached a plurality of agents, such as channel adapters, and at least one primary bus to which is attached a peripheral device server. The incorporated '610 application additionally defines many of the terms employed herein, and such definitions are also available from publications provided by the PCI Special Interest Group, and will not be repeated here. Complex PCI bus systems, such as that of the incorporated '610 application, employ arbitration between commands from the attached channel adapters on the PCI bus system to manage the usage of the bus system in an efficient manner.

Computer data storage systems may employ PCI bus systems to provide fast data storage from host processors, such as network servers, via channel adapters and the PCI bus system, to attached storage servers having storage devices, cache storage, or non-volatile cache storage. It is advantageous to provide data storage that operates at relatively fast speeds which approach or match the speeds of the host processors, or that release the host processors, such that the host processors are not slowed. The incorporated '610 application additionally defines many of the terms employed herein, and such definitions are also available from publications provided by the PCI Special Interest Group, and will not be repeated here.

Typically, such channel adapters transfer write data in bursts of multiple contiguous words, where a word comprises data bits which are equal to the width of the data bus. In a PCI bus system, the write data is received from the channel adapters at the secondary PCI bus by one or more PCI bus adapters. A PCI bus adapter has a command queue which queues the operation commands on a FIFO basis, and the associated address and data in a queue buffer. Preferably, the command queue and queue buffer are sufficiently large that a single write command, the address to which the write data is directed, and the data burst may be queued at once. This arrangement allows the data transfer to be conducted efficiently.

The PCI bus adapter has the ability to issue a "Type B disconnect" action if the queue buffer is full and the adapter is unable to conduct "target ready" pacing, which causes the requesting agent, such as a channel adapter, to disconnect and return the bus to an idle state. If the request is a burst write command, and the PCI bus adapter is the target of that data, the amount of data stored at the PCI bus target is the space available in the target's queue buffer when the burst write began. If the space available was two locations in the buffer, when the amount of data stored in the queue buffer would be one, because the address and command would take one location and the data another. As is known to those of skill in the art, if multiple commands are in the command queue, the PCI bus adapter is unable to conduct "target ready" pacing, and the burst write would be stored as a command in the command queue and the address and a single word of data in the queue buffer.

If for example, the PCI bus target has queued several single word write commands preceding the attempted burst write, as it executes the write commands from the command queue, it makes room for an additional single word write command. The requesting agent (channel adapter) granted access to the PCI bus and targeting this agent, will be allowed to write just one word of data before receiving another disconnect, because the target's queue buffer went full again and the target was unable to conduct "target ready" pacing. This condition is called data fracturing and could be repeated for the entire write burst size. If, as an example, the requesting agent wanted to provide a write burst of 128 words, the burst could be broken up into 128 single word operations. Even worse, there could be several requesting agents on the PCI bus attempting to execute a burst write to this same target, and their bursts could all be broken up into single word writes. The resultant performance of the PCI bus system is severely degraded in this circumstance, as is the performance of the attached requesting agents and the agent (such as the data storage system) that is the destination for the data, because single word operations on the PCI bus are much slower than PCI burst operations.

SUMMARY OF THE INVENTION

An object of the present invention is to limit fracturing of PCI burst write operations and thereby enhance the effective PCI bandwidth.

In a PCI bus system for transferring write data in the form of write data bursts comprising a plurality of contiguous words, a system and method are disclosed for limiting fracturing of burst write data. The PCI bus system has at least one PCI bus for coupling at least one PCI data source to the PCI bus system, and a PCI bus target, such as a PCI bus adapter, coupled to the PCI bus for receiving and transferring the write data from the PCI data source, the PCI bus target queuing operation commands in a command queue.

The system for limiting fracturing of the write data comprises fracture detection logic which monitors the PCI bus target to sense fracturing of the write data. Queue level detection logic is employed to monitor completion of the queued operation commands of the PCI bus target. A bus arbiter is responsive to the fracture level detection logic sensing the fracturing of write data by the target, and blocks access to the PCI bus. The bus arbiter is then responsive to the command queue level detection logic indicating, subsequent to the blocking, that the PCI bus target has completed enough operations that a predetermined number (such as one) of the operation commands remain queued at its command queue, and grants access to the PCI bus to allow the PCI data source to complete the burst write operation without fracturing.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
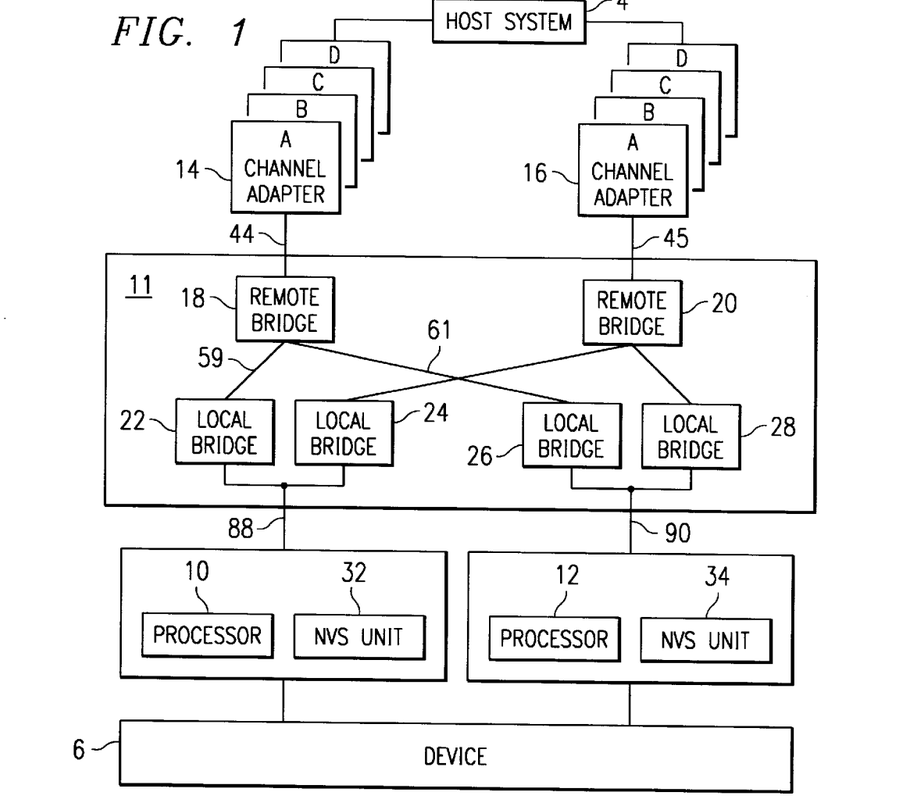
FIG. 1 is a block diagram of a PCI bus system in accordance with an embodiment of the present invention and attached host systems and devices.

Referring to FIG. 1, a PCI bus system 11 is illustrated in accordance with an embodiment of the present invention which provides communication paths, for example, between one or more host systems 4 and devices such as processors 10, 12, a device 6, and NVS (non-volatile store) units 32, 34. The exemplary PCI bus system 11 is based upon that illustrated in the incorporated '610 application, employing similar components, modified in accordance with the present invention. As discussed in the incorporated '610 application, the device 6 may comprise an direct access storage device subsystem, such as a string of DASDs.

The PCI bus system 11 allows the host systems 4 to communicate with the processor 10, and processor 12, employing adapters 14A, B, C and D, 16A, B, C and D or other communication agents (not shown), including any device that typically communicates over a PCI bus. The channel adapters 14, 16 may comprise channel adapter cards that are each connected via a slot on the PCI bus system to a remote bridge 18, 20 of the PCI bus system 11. Each channel adapter card provides a connection to one or more host systems 4 at a secondary PCI bus 44, 45. Briefly, processor 10 controls a primary PCI bus 88, and processor 12 controls a primary PCI bus 90, each providing addresses for access by the adapters 14, 16 at secondary PCI busses 44, 45.

Two remote bridges 18, 20 may be coupled to different sets of channel adapters or other communication agents, and each remote bridge is coupled to local bridges. Thus, remote bridge 18 is coupled to local bridges 22, 26, and remote bridge 20 is coupled to local bridges 24, 28. In the instant example, the local bridges 22, 24 may communicate with processor 10 and NVS unit 32 on primary PCI bus 88, and the local bridges 26, 28 may communicate with processor 12 and NVS unit 34 on primary PCI bus 90, although other arrangements may be envisioned by those of skill in the art. Thus, in the present example of a PCI bus system, the adapters 14A–D coupled to remote bridge 18 may communicate with the processors 10, 12 or NVS unit 32, 34 over the PCI bus system 11.

An important communication in a PCI bus system is the writing of data by a host system 4 at the NVS units 32, 34 and at a device 6, the data stored in the selected unit or device under the control of the processor 10. Host systems typically deal with and process large amounts of data and require prompt access to, or storage of, that data to allow the host systems to continue processing without substantial wait times. Therefore, low latency of the bus system is required for such prompt access or storage. The Peripheral Component Interconnect (PCI) bus system is a high-performance expansion bus architecture which offers such a low latency path employing PCI bridges through which a host processor may directly access PCI devices.

In a multiple host environment, a PCI bus system may include such functions as data buffering and PCI central functions such as arbitration over usage of the bus system. As the result, the PCI bus systems become increasingly complex.

The incorporated '610 application describes an example of a complex PCI bus system for providing a connection path between a secondary PCI bus and at least one primary PCI bus, to which are attached one or more computer system data storage controllers, such as processor 10, 12. The computer system data storage controllers employ the PCI bus system to provide fast data storage from the hosts.

In FIG. 1, in the PCI bus systems, the channel adapters 14, 16 provide PCI write commands and data at the secondary PCI bus 44, 45 to transfer the data to their destinations, and the remote bridge 18, 20 to which the data is transferred across the secondary bus further transfers the data to a local bridge 22, 24, 26, 28, which subsequently transfers the data at the primary us 88, 90 to the destination. Typically, write data transfers are burst write transfers of large amounts of data.

Figure 2:
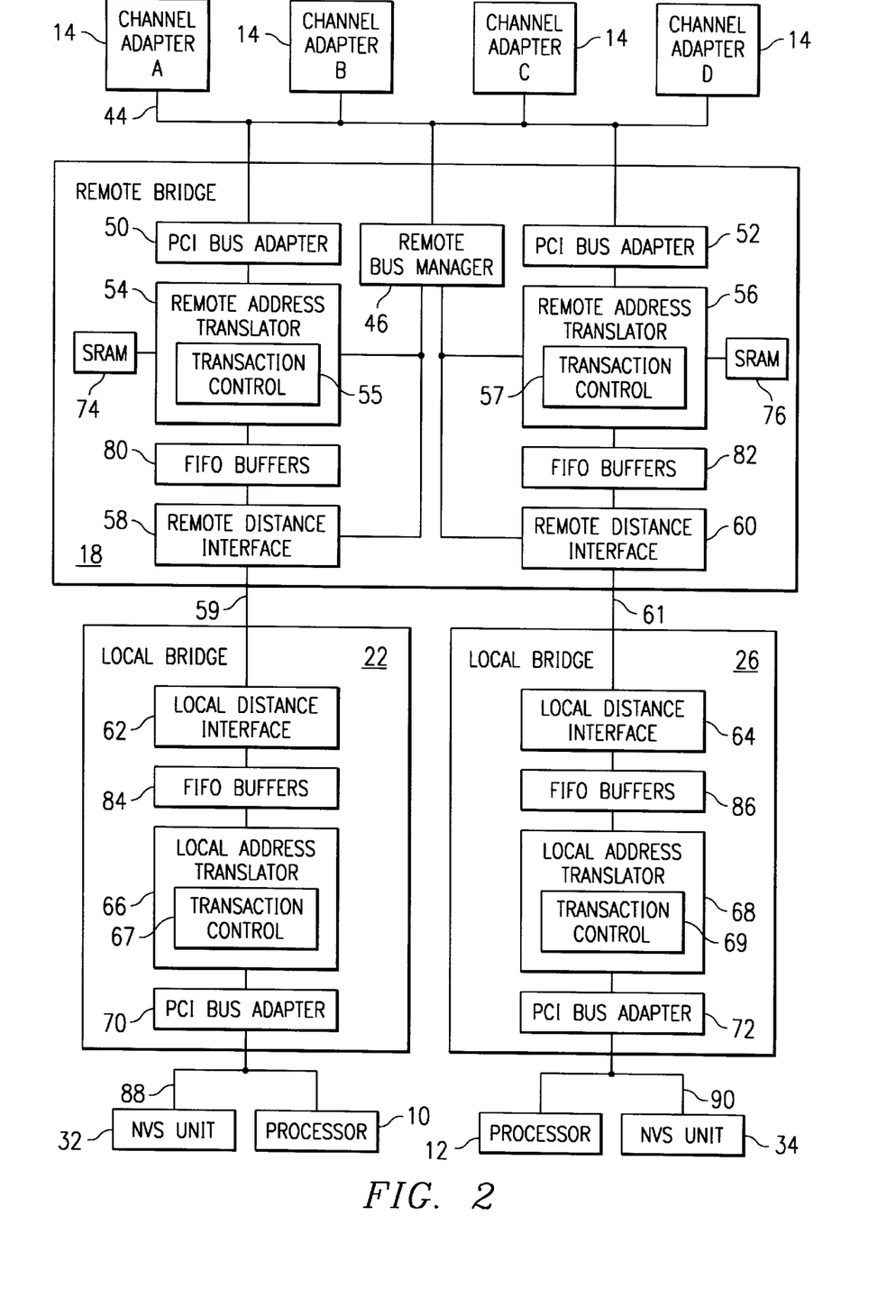
FIG. 2 is a block diagram of the PCI bus system of FIG. 1, illustrating a PCI remote bridge and two PCI local bridges.

Referring additionally to FIG. 2, further detail of one-half of the exemplary complex PCI bridge system of FIG. 1 is illustrated. As discussed in the incorporated '610 application, complex PCI systems employ arbitration between commands from the attached channel adapters on the secondary PCI bus to manage the usage of the bus system in an efficient manner. In the example of FIG. 2, the arbitration is conducted by a bus manager 46. Typically, a PCI bus manager 46 provides the grants to the channel adapters 14A–D on secondary PCI bus 44 in a round-robin fashion. The exemplary PCI bus system of FIG. 2 includes the PCI bus manager 46 which manages data and signals presented on the secondary PCI bus 44. The PCI bus manager 46 comprises bus central resource functions, which include circuitry that manages the bus arbitration discussed above, bus parking, and other bus management functions, preferably with standalone circuitry. The bus manager 46 has information describing the address ranges of the agents attached to the remote bridge 18, the PCI bus adapters 50 and 52, and other elements of the remote bridge, and uses this information to determine which agent or element is targeted by a PCI operation. The information on the address ranges is preferably written to registers in the bus manager 46, and may be copied to the PCI bus adapters 50 and 52. The remote bridge 18 also comprises remote address translators 54, 56, transaction controls 55, 57, remote distance interfaces 58, 60, and static random access memories (SRAM) 74, 76, or any other suitable memory devices. The PCI bus adapter 50, remote address translator 54, transaction control 55, and remote distance interface 58 provide communication between channel adapters 14 and local bridge 22. The PCI bus adapter 52, remote address translator 56, transaction control 57, and remote distance interface 60 provide communication between channel adapters 14 and local bridge 26. The channel adapters 14A, B, C, D communicate with either PCI bus adapter 50 or 52 via the secondary PCI bus 44. The PCI bus adapters 50, 52, remote address translators 54, 56, transaction control 55, 57, remote distance interfaces 58, 60 and SRAMs 74, 76 may comprise logical elements of PCI bridges as are known in the art or any other suitable type of bridge circuitry. The remote 58, 60 and local 62, 64 distance interfaces include controls and buffers known in the art to control transactions between the remote bridge 18 and the local bridges 22, 26 and provide for long distance communication therebetween over long distance connections 59, 61. The remote bridge 20 may be the same or similar to the remote bridge 18, and also provides communication with the local bridges 24, 28.

Each local bridge 22, 26 comprises, respectively, a local distance interface 62, 64, a local address translator 66, 68, a transaction control 67, 69, and a PCI bus adapter 70, 72. The remote 54, 56 and local 66, 68 address translators include circuitry known in the art to map a received address to another address space. Remote address translators 54, 56 perform address translation operations by mapping an address provided by channel adapters 14 to the address space of the local PCI bus adapters 70, 72, respectively. Local address translators 66, 68 map an address from the local PCI bus adapters 70, 72 to the remote PCI bus adapter 50, 52 address space, such that this translated address is transmitted to the remote address translator 54, 56 via the local 62, 64 and remote 58, 60 distance interfaces. In such case, the remote address translator 54, 56 may buffer and transmit this received address to the remote PCI bus adapters 50, 52. Similarly, after remote address translator 54, 56 translates an address received from the remote PCI bus adapter 50, 52 to the address space of the local PCI bus adapter 70, 72, respectively, this translated address is transmitted to the local address translator 66, 68 via the remote 58, 60 and local 62, 64 distance interfaces. In such case, the local address translator 66, 68 may buffer and transmit this received address to the local PCI bus adapter 70, 72.

The FIFO buffer sections 80, 82, 84, and 86 queue the read/write transactions in the PCI bus system 11. Each of the FIFO buffer sections comprises multiple FIFO buffers to queue the transaction from the channel adapters 14A, B, C, D and the processor 10. The address translators 54, 56, 66, and 68 include transaction control circuitry 55, 57, 67, and 69 that includes logic to select queues in the FIFO buffers 80, 82, 84, and 86 to place a transaction and manage the flow of transactions. The FIFO buffers insure that the write commands are kept in sequence as they progress through the PCI bus system 11.

The PCI busses 44, 88 and 90 are designed for only very short distances, measured substantially in inches, and small loads, and the distance connections 59, 61 are designed for longer distances with greater loads.

Figure 3:
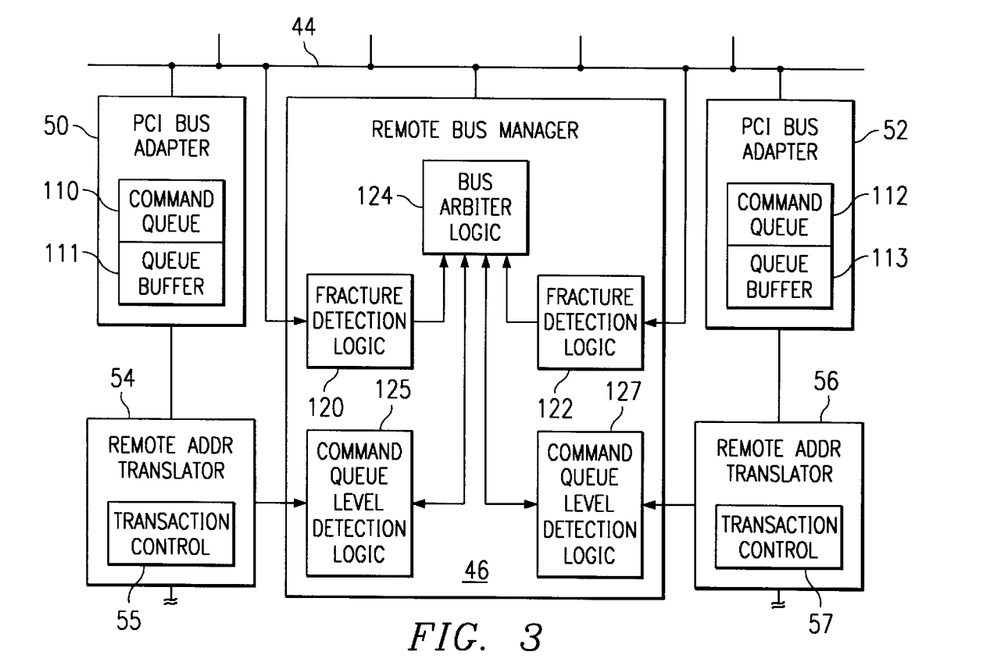
FIG. 3 is a block diagram of the remote bus manager, PCI bus adapters, and remote address translators of FIG. 2 arranged to implement an embodiment of the present invention.

Referring to FIGS. 2 and 3, typically, PCI bus systems transfer write data in bursts of multiple contiguous words, which is received from the channel adapters 14A–D at the secondary PCI bus 44 by one or more PCI bus adapters 50, 52. The PCI bus adapters may, for example, comprise the commercially available PCI 9060 PCI Bus Master Interface chip provided by PLX Technology, Inc., 390 Portrero Avenue, Sunnyvale, Calif. 94086. A PCI bus adapter has a command queue 110, 112 which queues the operation commands, on a FIFO basis, and a queue buffer 111, 113 which queues the addresses and data associated with the commands. Preferably, the command queue and queue buffer are sufficiently large that a single write command, the address to which the write data is directed, and the data burst may be queued at once. This arrangement allows the data transfer to be conducted efficiently.

As is known by those of skill in the art, if the queue buffer 111, 113 has sufficient room, the PCI bus adapter 50, 52 may allow a burst write to be conducted, and may "target ready" or "TRDY" pace the data through the queue buffer 111, 113 to prevent overruns. However, if there are multiple commands in the command queue, the adapter is unable to "TRDY" pace if the queue buffer is full or nearly so. Thus, the PCI bus adapter 50, 52 has the ability to issue a "Type B disconnect" action if the queue buffer 111, 113 becomes full and the adapter is unable to "TRDY" pace, which causes the requesting agent, such as a channel adapter, to disconnect. If the request is a burst write command, and the PCI bus adapter is the target of that data, the amount of data stored at the PCI bus target is the space available in the target's queue buffer when the burst write began. If the space available was two locations, then the amount of data stored in the queue 111, 113 would be one, because the address would take one location and the data another. The burst write in this case would be stored as only a single word write in the command queue and queue buffer, and further data transfer stopped and disconnected, fracturing the data stream.

If, as a worst case example, the PCI bus target, the PCI bus adapter 50, 52, has queued several single word write commands preceding the attempted burst write and is unable to do "target ready" pacing, as it executes the write commands from the command queue, it can make room in the command queue 110, 112 and queue buffer 111, 113 for an additional single word write command and associated address and one word of data. The requesting channel adapter 14A–D granted access to the PCI bus 44 and targeting the PCI bus adapter 50, 52, will be allowed to write just one word before receiving a disconnect, because the target's command queue 110, 112 and queue buffer 111, 113 became full again, thereby further fracturing the data stream. In the prior art, the data fracturing could be repeated for the entire write burst size, e.g., a write burst of 128 words, breaking the burst into 128 single word operations. Even worse, there could be several requesting agents on the PCI bus attempting to execute a burst write to this same target, and their bursts could all be broken up into single word writes. The resultant performance of the PCI bus system is severely degraded in this circumstance, as is the performance of the attached requesting agents and the agent (such as the data storage system) that is the destination for the data, because single word operations on the PCI bus are much slower and inefficient than PCI burst operations.

In FIG. 3, one embodiment of the present invention is illustrated wherein the remote bus manager 46 is provided with a fracture detection logic 120, 122 for each of the PCI bus adapters 50, 52 to sense, preferably at the PCI bus 44, the fracturing of the data stream by the associated PCI bus adapter. As an alternative, the logic of the remote bus arbiter may be arranged to share one fracture detector between the PCI bus adapters. Upon sensing fracturing at a PCI bus adapter, the fracture detection logic 120, 122 signals the fracturing to bus arbiter logic 124. The bus arbiter responds to the sensing of the fracturing of write data by the target, and blocks access to the PCI bus by the channel adapters. This will allow the fracturing PCI bus adapter 50, 52 to continue executing the commands in the command queue 110, 112, gradually emptying the queue.

Command queue level detection logic 125, 127 monitor the transaction control 55, 57 associated with the fracturing PCI bus adapter to sense completion of the execution of each command of the command queue. In one alternative, a shadow command queue of equal size to queue 50, 52 is maintained by the bus arbiter 124, and is decremented by the command queue level detection logic 125, 127. In another alternative, the number of operations remaining to be executed in the command queue is provided to the command queue level detection logic, and is decremented by the command queue level detection logic. Subsequent to the blocking, the bus arbiter 124 is then responsive to the command queue level detection logic 125, 127 indicating that the fracturing PCI bus adapter 50, 52 has completed enough operations that a predetermined number (such as one) of the commands remain queued at its command queue 110, 112, and grants the PCI data source (channel adapter) access to the PCI bus to complete the burst write operation without fracturing.

Thus, the PCI bus adapter will have emptied its command queue and queue buffer, and will be able to do target ready ("TRDY") pacing and thus accept the remainder of the burst write command without fracturing.

Figure 4A:
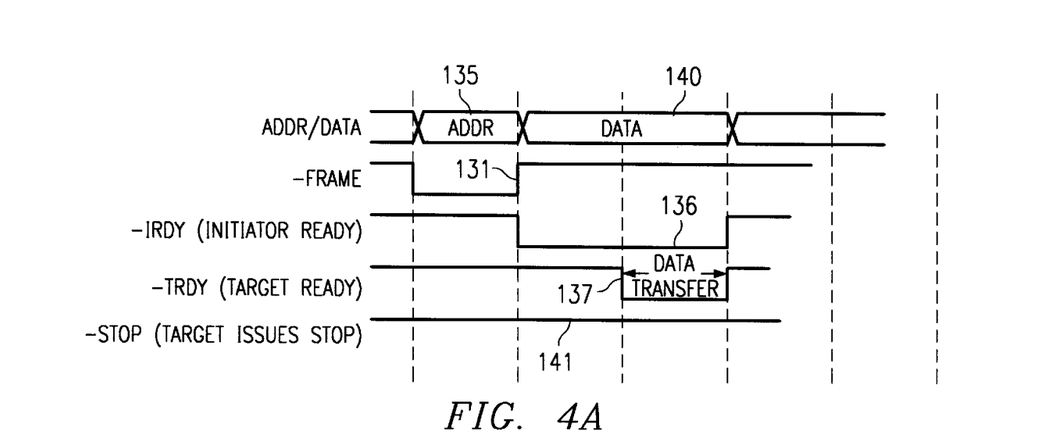
FIGS. 4A, 4B and 4C are timing diagrams depicting, respectively, one, two and three word write data transfer operations.
Figure 4B:
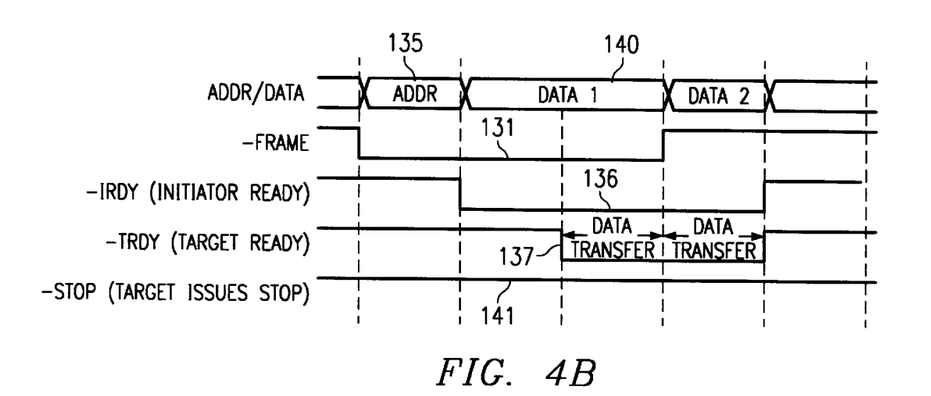
Figure 4C:
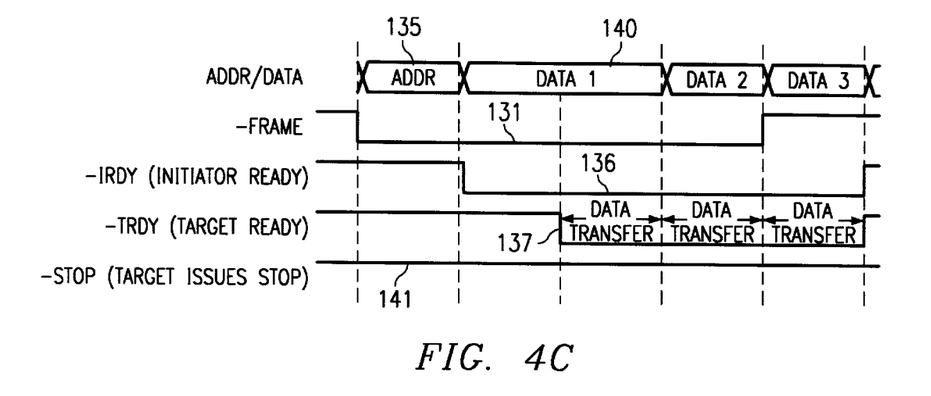

Exemplary one, two and three word PCI bus write data transfer signals of a PCI bus are illustrated respectively in FIGS. 4A, 4B and 4C. The signals are illustrated as asserted in the negative state and deasserted in the positive state. A cycle frame signal 131 is driven by the initiator of the command, e.g., a channel adapter, and indicates the start and duration of a transaction. The transaction will be from an initiator that has been granted ownership of the bus by the bus manager 46 in FIGS. 2 and 3, by means of a grant signal (not shown). The command is provided as, e.g., 4 bits, on a command/byte enable bus (not shown), and the address is provided as, e.g., 32 bits 135, on an address/data bus, both busses comprising the PCI bus. An initiator ready signal 136 is driven by the current bus master (the initiator of the transaction). During a write, the initiator ready signal 136 is asserted to indicate that the initiator is driving valid data 140 onto the data bus. Target ready 137 is driven by the currently addressed target, e.g., the PCI bus adapter. It is asserted when the target is ready to accept data from the master and complete the current data phase (data transfer). The data 140 is then accepted at the PCI bus by the target.

If the target is unable to complete the entire data transfer and unable to conduct "target ready" pacing, the target will assert a "Type B disconnect", employing a stop signal. The illustration of the stop output 141 is shown in the null or off state. The stop signal forces the initiator to terminate the transfer.

Figure 5:
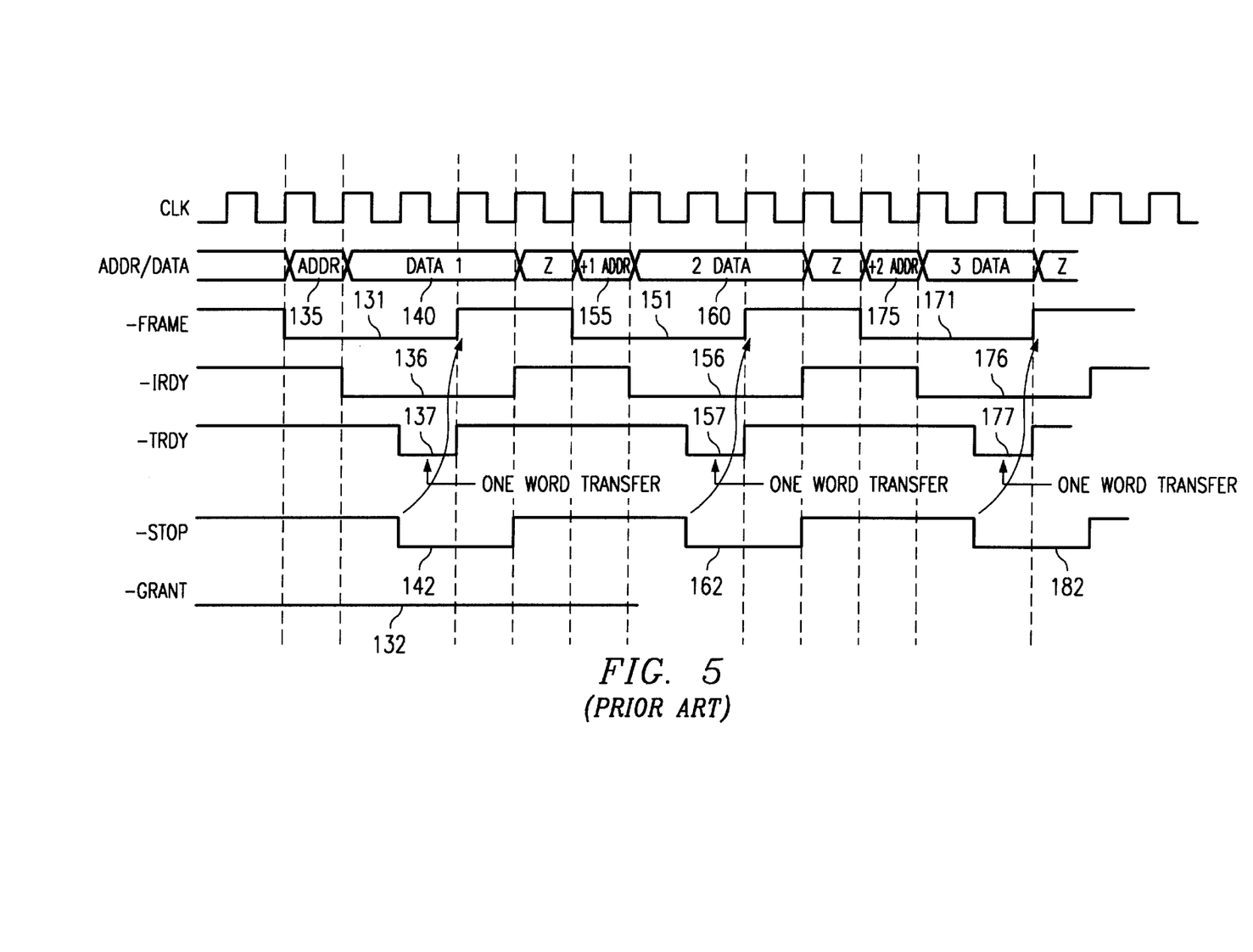
FIG. 5 is a timing diagram of a burst write command in the prior art where fracturing occurs.

PCI bus signaling for a burst write data transfer is illustrated in FIG. 5 as suffering from fracturing of the prior art. As above, a cycle frame signal 131 is driven by the initiator of the command, e.g., a channel adapter, and indicates the start and duration of a transaction. The bus manager 46 will have granted ownership of the PCI bus to the initiator by means of a grant signal 132. The command is provided on the command/byte enable bus (not shown), and the address 135 is provided on an address/data bus. An initiator ready signal 136 is asserted by the initiator of the transaction to indicate that the initiator is driving valid data 140 onto the data bus. Target ready 137 is driven by the currently addressed target PCI bus adapter and indicates that the target is ready to accept at least one word of data from the initiator. The data 140 is then accepted at the PCI bus by the target.

The initiator wishes to transfer a burst write by maintaining the frame 131 active, however, in the illustrated prior art example, the queue buffer is filled as soon as one word of data is loaded, such that the target is unable to complete the entire data transfer. Thus, the target asserts a stop signal 142 for a "Type B disconnect". The stop signal forces the initiator to terminate the transfer and try again with the next address 155 (incremented by the length of the transferred word).

In greater detail, the grant 132 remains active since the initiator has not completed the transaction, and the initiator terminates the frame signal 131. With the frame terminated, the target drops the stop signal 142 and the initiator may reassert the frame 151 and initiator ready 156 signals. The target will have executed a command and the command queue and queue buffer will be available, so that the target again asserts the target ready signal 157. Again, the queue buffer fills after one word 160 is transferred, and the target asserts the stop signal 162. The initiator is forced again to terminate the data transfer and go through the cycle still again, providing frame 171, address 175 and initiator ready 176. The target then again provides a target ready signal 177, and once again asserts a stop signal 182. The process may go on for the entire burst write, resulting in an inefficient data transfer operation.

Figure 6:
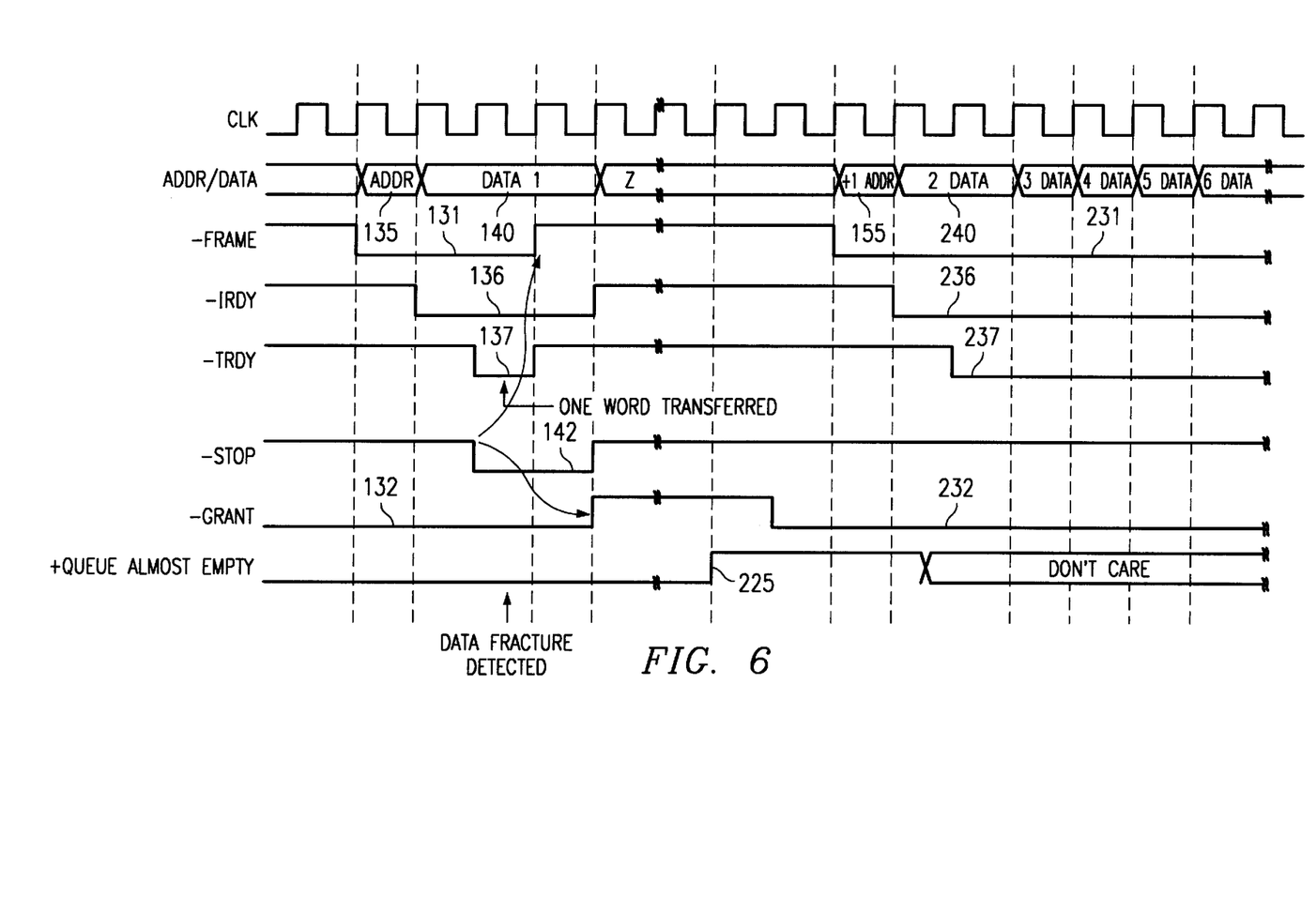
FIG. 6 is a timing diagram of a burst write command conducted in accordance with the present invention to limit fracturing.
Figure 7:
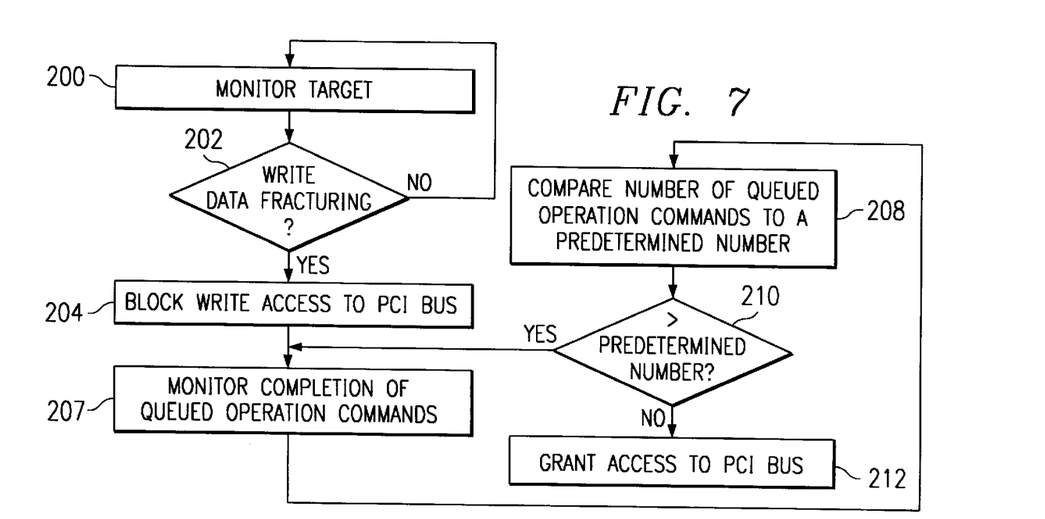
FIG. 7 is a flow chart depicting an embodiment of the method of the present invention.

PCI bus signaling for a burst write data transfer in accordance with the present invention is illustrated in FIG. 6, and an embodiment of the method of the present invention is illustrated in FIG. 7. Referring additionally to FIGS. 1–3, a cycle frame signal 131 is driven by the initiator of the command, e.g., a channel adapter 14A–D. The bus arbiter logic 124 of the bus manager 46 will have granted ownership of the PCI bus to the channel adapter by means of a grant signal 132. The command is provided on the command/byte enable bus (not shown), the address 135 is provided on the address/data bus, and an initiator ready signal 136 is asserted by the initiator to indicate that the initiator is driving valid data 140 onto the data bus. Target ready 137 is driven by the currently addressed target PCI bus adapter, e.g., PCI bus adapter 50, and indicates that the target is ready to accept at least one word of data from the initiator. The data 140 is then accepted from the PCI bus by the target.

The bus manager 46 maintains a copy of the base address register for both PCI bus adapters 50 and 52, which is used to monitor the secondary PCI bus 44 for any operations that target either of the adapters. In step 200, referring to PCI bus adapter 50, the bus manager 46 compares the address on the PCI bus 44 with its copy of the base address register for PCI bus adapter 50. If the address compares and the PCI operation is a write, the fracture detection logic 120 is enabled, and monitors secondary PCI bus for a "Type B disconnect" action. If no fracturing is detected in step 202, the fracture detection logic continues monitoring in step 200.

In the instant example of a burst write, the initiator maintains the frame 131 active. As before, the queue buffer 111 is filled as soon as one word of data is loaded, such that the target is unable to complete the entire data transfer. Thus, the target asserts a stop signal 142, for a "Type B disconnect" action. The stop signal forces the initiator to terminate the transfer.

Now, however, in step 202, the fracture detection logic 120 detects the target assertion of the stop signal 142 while the initiator ready signal 136 is asserted, and while the target is asserting the target ready signal 137, thereby sensing fracturing of the data stream. In step 204, the bus abiter logic 124 responds to the fracture detection logic's sensing of the fracturing of write data by the target, removing the grant 132. Further, the bus arbiter blocks access to the PCI bus 44 by the channel adapters 14A–D, by not issuing any grant signals. This will allow the fracturing PCI bus adapter 50 to continue executing the commands in the command queue 110, gradually emptying the command queue and queue buffer 111. Access to the PCI busses may be granted to agents of the PCI bus system including the PCI bus target to insure that the commands in the queue are executed.

In step 207, command queue level detection logic 125 monitors the transaction control 55, associated with the fracturing PCI bus adapter, to sense completion of the execution of each command of the command queue 110. As discussed above, in one alternative, a shadow command queue is maintained by the bus arbiter 124, and is decremented by the command queue level detection logic 125. In another alternative, the number of operations remaining to be executed in the command queue is provided to the command queue level detection logic, and is decremented by the command queue level detection logic.

In step 208, upon completion of each command by the PCI bus adapter, the remaining number of queued commands is compared to a predetermined number. Preferably, the predetermined number is "one", to indicate that only one operation remains. If the remaining number of operations is greater than the predetermined number, step 210 cycles back to step 207 to continue monitoring the queue 110.

If, however, step 210 indicates that the queue is down to the predetermined number, "NO", the bus arbiter 124, in step 212, responds to the command queue level detection logic 125 indicating, by means of signal 225, that the fracturing PCI bus adapter 50 has completed enough operations that a predetermined number of the operation commands remain queued at its command queue 110, and grants access to the PCI bus. At this point, the PCI bus adapter will be able to accept a burst write command without fracturing.

The bus arbiter logic 124 may not grant access to the original requester in step 212, but may instead proceed with the round robin process and grant access to another requester. Ultimately, after the other transactions are completed, the bus arbiter logic will grant access to the original requester by asserting the grant 232.

The original channel adapter 14A–D, as in the prior art, will have been forced to try the burst write again with the next address 155 (incremented by the length of the transferred word). Now, however, the PCI bus adapter will be able to accept the burst write command without fracturing. Thus, the frame signal 231 is asserted while the command is provided on the command/byte enable bus, the address 155 is provided on the address/data bus, and an initiator ready signal 236 is asserted by the initiator. The target ready signal 237 is driven by the currently addressed target PCI bus adapter, e.g., PCI bus adapter 50, and indicates that the target is ready to accept, in this case, all of the data from the initiator. The data 240 driven onto the PCI bus by the initiator is then accepted by the target, and the remainder of the burst write transfer operation is completed without fracturing.

The identical method is accomplished by the fracture detection logic 122, the command queue level detection logic 127, and the bus arbiter logic 124, with the command queue 112 and queue buffer 113 for PCI bus adapter 52 and transaction control 57, for burst write commands from PCI bus 44.

The embodiments of the present invention specifically relate to PCI bus systems, but equally relate to equivalently arranged bus systems.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a PCI bus system for transferring write data in the form of write data bursts comprising a plurality of contiguous words, said PCI bus system having at least one PCI bus for coupling at least one PCI data source to said PCI bus system, and a PCI bus target coupled to said PCI bus for receiving and transferring said write data from said PCI data source, said PCI bus target queuing operation commands in a command queue, a method for limiting fracturing of said write data, comprising the steps of:

sensing fracturing of said write data;

upon said fracture sensing step sensing said fracturing by said PCI bus target, blocking access to said PCI bus;

subsequent to said blocking step, monitoring completion of said queued operation commands of said PCI bus target; and upon said completion monitoring step indicating a predetermined number of said operation commands remain queued at said PCI bus target, allowing grants of access to said PCI bus by said at least one PCI data source.

2. The method of claim 1, wherein said monitoring completion step additionally comprises identifying the number of remaining said queued operation commands at said PCI bus target command queue at the time of said blocking step, decrementing said number of remaining operation commands in response to each monitored completion of said completion monitoring step, comparing said number of remaining operation commands to said predetermined number, and, upon said comparison step compared numbers being equal, providing said predetermined number indication.

3. The method of claim 2, wherein said predetermined number is one said remaining operation command.

4. The method of claim 1, wherein a plurality of said PCI data sources are coupled to said PCI bus, and wherein said blocking step comprises blocking said access to said PCI bus by all of said plurality of PCI data sources, and allowing continued access by said PCI bus target and said PCI bus system.

5. The method of claim 1, wherein said PCI bus target asserts a "Type B disconnect" action to prevent further issuance of data by a data source during a write operation, and wherein said fracture sensing step comprises monitoring said PCI bus to sense said assertion of said "Type B disconnect" action after allowing queuing of a write operation.

6. In a PCI bus system for transferring write data in the form of write data bursts comprising a plurality of contiguous words, said PCI bus system having at least one PCI bus for coupling at least one PCI data source to said PCI bus system, and a PCI bus target coupled to said PCI bus for receiving and transferring said write data from said PCI data source, said PCI bus target queuing operation commands in a command queue, a system for limiting fracturing of said write data, comprising:

fracture detection logic sensing fracturing of said write data;

queue level detection logic monitoring completion of said queued operation commands of said PCI bus target; and a bus arbiter responsive to said fracture detection logic sensing said fracturing of said write data by said PCI bus target, blocking access to said PCI bus, and, subsequent to said blocking, responding to said queue level detection logic indicating a predetermined number of said operation commands remain queued at said PCI bus target command queue, granting access to said PCI bus by said at least one PCI data source.

7. The system of claim 6, wherein said queue level detection logic additionally comprises identifies the number of remaining said queued operation commands at said PCI bus target command queue at the time said bus arbiter blocks said access, decrementing said number of remaining operation commands in response to each said monitored completion, comparing said number of remaining operation commands to said predetermined number, and, upon said comparison step compared numbers being equal, providing said predetermined number indication.

8. The system of claim 7, wherein said predetermined number is one said remaining operation command.

9. The system of claim 6, wherein a plurality of said PCI data sources are coupled to said PCI bus, and wherein said bus arbiter blocks said access to said PCI bus by all of said plurality of PCI data sources, while allowing continued access by said PCI bus target and said PCI bus system.

10. The system of claim 6, wherein said PCI bus target asserts a "Type B disconnect" action to prevent further issuance of data by a data source during a write operation, and wherein said fracture detection logic senses said assertion of said "Type B disconnect" action after allowing queuing of a write operation.

11. A PCI bus system for transferring write data in the form of write data bursts comprising a plurality of contiguous words, from at least one PCI data source, and limiting fracturing of said write data, said PCI bus system comprising:

at least one PCI bus for coupling said at least one PCI data source to said PCI bus system;

a PCI bus target coupled to said PCI bus for receiving and transferring said write data from said PCI data source, said PCI bus target having a command queue for queuing operation commands;

fracture detection logic sensing fracturing of said write data;

queue level detection logic monitoring completion of said queued operation commands of said PCI bus target; and a bus arbiter responsive to said fracture detection logic sensing said fracturing of said write data by said PCI bus target, blocking access to said PCI bus, and, subsequent to said blocking, responding to said queue level detection logic indicating a predetermined number of said operation commands remain queued at said PCI bus target command queue, granting access to said PCI bus by said at least one PCI data source.

12. The PCI bus system of claim 11, wherein said queue level detection logic additionally comprises identifies the number of remaining said queued operation commands at said PCI bus target at the time said bus arbiter blocks said access, decrementing said number of remaining operation commands in response to each said monitored completion, comparing said number of remaining operation commands to said predetermined number, and, upon said comparison step compared numbers being equal, providing said predetermined number indication.

13. The PCI bus system of claim 12, wherein said predetermined number is one said remaining operation command.

14. The PCI bus system of claim 11, wherein a plurality of said PCI data sources are coupled to said PCI bus, and wherein said bus arbiter blocks said access to said PCI bus by all of said plurality of PCI data sources, while allowing continued access by said PCI bus target and said PCI bus system.

15. The PCI bus system of claim 11, wherein said PCI bus target asserts a "Type B disconnect" action to prevent further issuance of data by a data source during a write operation, and wherein said fracture detection logic senses said assertion of said "Type B disconnect" action after allowing queuing of a write operation.

* * * * *